United States Patent [19]

Iizuka et al.

[11] Patent Number: 4,566,289

[45] Date of Patent: Jan. 28, 1986

[54] REFRIGERATOR CONTROL SYSTEM

[75] Inventors: Kenichi Iizuka, Ashikaga; Hideo Uzuhashi, Tochigi; Yoshihisa Uneyama, Tochigi; Michiya Matuda, Tochigi; Minoru Kobayashi, Tochigi, all of Japan

[73] Assignee: Hitachi, Ltd., Tokyo, Japan

[21] Appl. No.: 669,800

[22] Filed: Nov. 9, 1984

[30] Foreign Application Priority Data

Nov. 16, 1983 [JP] Japan ............................ 58-213962
Mar. 12, 1984 [JP] Japan ............................ 59-45415

[51] Int. Cl.⁴ .......................... F25B 1/00; H02P 5/28
[52] U.S. Cl. .................................. 62/228.4; 62/236; 318/807; 417/45

[58] Field of Search ............ 62/236, 228.4, 230; 417/45; 318/807, 305, 110

[56] References Cited

U.S. PATENT DOCUMENTS

| 3,499,297 | 3/1970 | Ruff et al. ............... 62/228.4 X |
| 3,753,069 | 8/1973 | Newton ..................... 318/778 X |
| 3,974,660 | 8/1976 | Farr ........................... 62/236 X |

*Primary Examiner*—William E. Wayner
*Attorney, Agent, or Firm*—Antonelli, Terry & Wands

[57] ABSTRACT

A novel refrigerator control system is disclosed which comprises an inverter for driving a motor for a compressor, and a change-over device for driving the compressor directly with a commercial power supply when the compressor motor is not driven by the inverter.

6 Claims, 6 Drawing Figures

REFRIGERATOR CONTROL SYSTEM

BACKGROUND OF THE INVENTION

1. Field of the Invention

The present invention relates to a control system for a refrigerator, or more in particular to a control system suitable for rapidly freezing the contents of a refrigerator.

2. Description of the Prior Art

A conventional freezing device has been suggested of which the freezing capacity is variable by stepless control of the rotational speed of a compressor, as disclosed in Japanese Patent Publication No. 26294/79.

The conventional refrigerators with variable freezing capacity, of which those having the ability to control the rotational speed of the compressor steplessly are highest in efficiency, have the disadvantages as mentioned below.

Since the speed control of the motor for driving the compressor requires a driving unit or an inverter, the total efficiency of the speed control motor is given by a product of the efficiency of the inverter and that of the motor proper. Therefore, the total efficiency of the motor is reduced in operation at its rating capacity below the efficiency of the motor when directly driven by commercial frequency at the rating. As a result, the efficiency of the whole refrigerator with variable freezing capacity is decreased.

SUMMARY OF THE INVENTION

Accordingly, it is the object of the present invention to obviate the above-mentioned disadvantages and to provide a refrigerator which can realize a variable freezing capacity while at the same time maintaining a high efficiency.

In order to achieve this object, there is provided according to the present invention, a refrigerator control system wherein, in view of the fact that the greatest effect of the variable freezing capacity of the refrigerator is represented by rapid freeze, the compressor is driven with an inverter in high-speed freeze mode while it is separated from the inverter and driven by the commerical power supply in the normal operating mode of the refrigerator.

DESCRIPTION OF THE PREFERRED EMBODIMENTS

Figure 1:
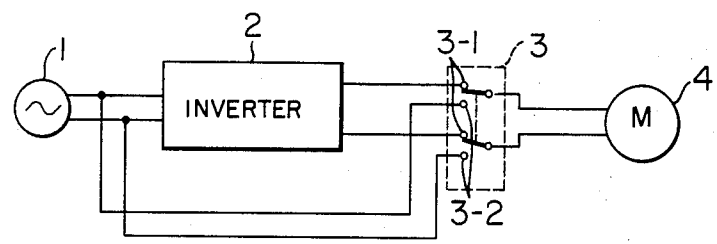
FIG. 1 is a diagram schematically showing an embodiment of the present invention.

In FIG. 1, reference numeral 1 designates a commercial power supply, numeral 2 an inverter circuit, 3 a change-over switch such as a relay, and numeral 4 a drive motor and a compressor which are assembled integrally. In this configuration, the change-over switch 3 is turned to terminal 3-2 to connect the power 1 with the compressor-driving motor 4 thus starting the same under the normal operating mode, while the change-over switch 3 is turned to terminal 3-1 to connect the compressor-driving motor 4 to the inverter circuit 2 in rapid freeze mode. By so doing, the compressor-driving motor 4 is driven by the inverter (the frequency of the commercial power supply is converted into the desired value by the inverter circuit, and the compressor-driving motor is driven by the converted frequency.), thus making the refrigerator capacity variable.

Figure 2:
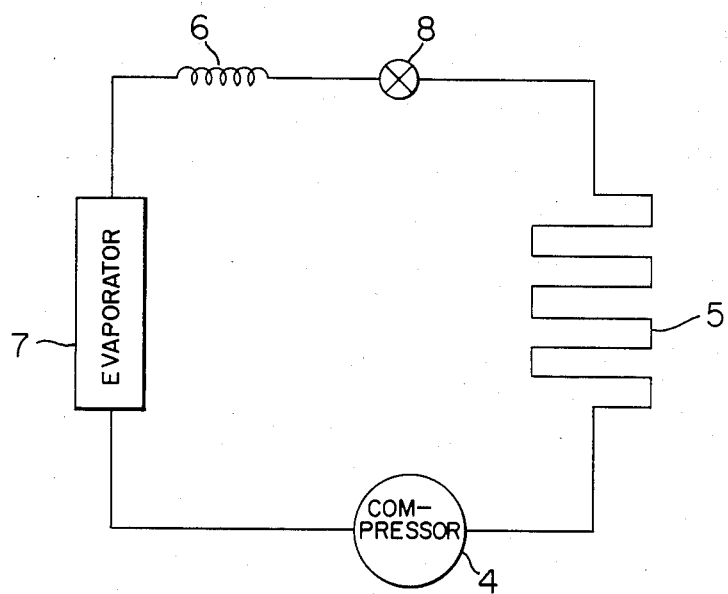
FIG. 2 shows a configuration of a freezing cycle.

The compressor 4 of course makes up a part of the well-known freezing cycle as shown in FIG. 2 used in the refrigerator. In the cycle shown in FIG. 2, the refrigerant increased in pressure by being adiabatically compressed discharges the heat thereof through a condenser 5, and is reduced in pressure through a pressure reducer 6. Finally, it evaporates through an evaporator 7 by absorbing heat from an external source. A solenoid valve 8 is for preventing the reverse flow of the refrigerant which otherwise might occur when the compressor 4 stops.

Figure 3:
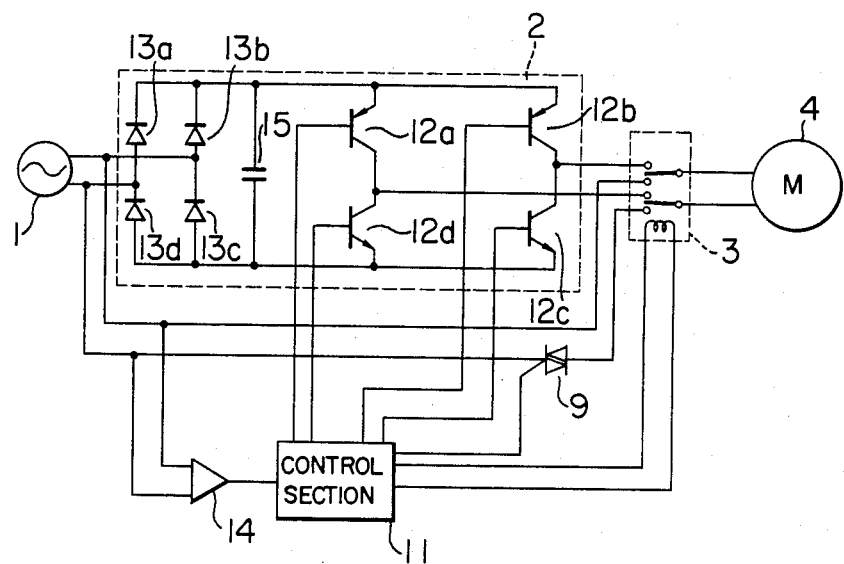
FIGS. 3 and 4 are diagrams showing the essential parts of the embodiment of FIG. 1.
Figure 5:
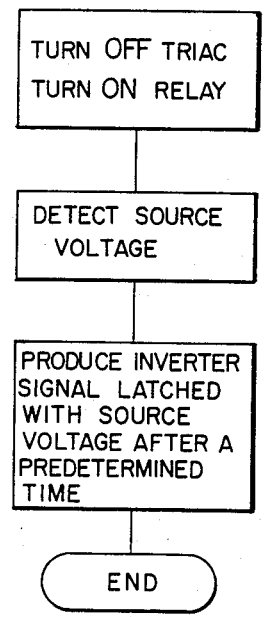
FIG. 5 shows a flowchart for explaining the essential parts.
Figure 6:
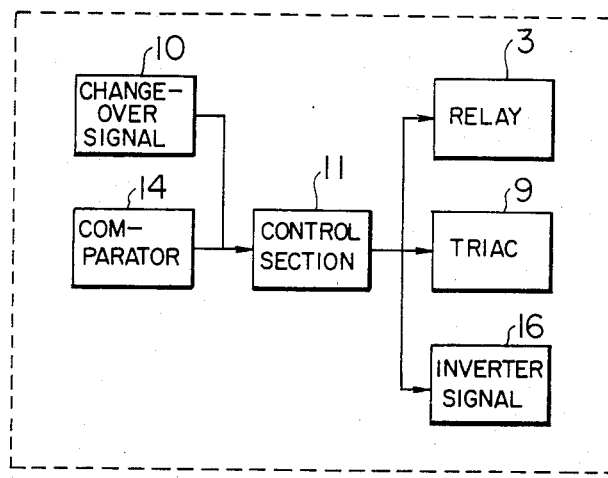
FIG. 6 is a block diagram for explaining the present invention.

FIG. 3 shows a basic circuit for the embodiment of the present invention shown in FIG. 2. In FIG. 3 where the same reference numerals as in FIG. 2 designate the same component elements as in FIG. 2 respectively, the inverter circuit 2 includes four fullwave-rectifying diodes 13a to 13d, a smoothing capacitor 15, and four power transistors 12a to 12d in single-phase bridge inverter construction. Numeral 11 designates a control section for producing a control signal to switch the relay 3 from the commercial power supply 1 to the inverter 2 or reversely. Numeral 9 designates a switch for driving the motor 4 directly by the commercial power supply, which switch may be a bidirectional semiconductor device such as triac. Numeral 14 designates a source voltage detector such as a voltage comparator which produces a pulse each time the source voltage comes zero potential. This pulse is applied to the control section to be used for producing a mode signal adapted to smoothly change the motor driving mode from the direct power drive mode, i.e. normal operation mode to the inverter drive mode. In the normal operation mode, the relay 3 is positioned to connect the compressor driving motor 4 directly to the commercial power supply 1, and the connection and disconnection of the motor 4 (such as a single-phase induction motor) is controlled by the bidirectional semiconductor device 9 such as triac. The operation of the switching from the commercial power supply 1 to the inverter 2 is effected in accordance with the flow chart shown in FIG. 5. This flow chart will be explained with reference to the block diagram of FIG. 6. As shown in FIG. 6, an external signal such as a signal from the switch designating rapid freeze is applied as a switching signal 10 to the control section 11. The external signal may be a pulse continuing a short time interval, for example, 3-4 sec. The control section 11 produces the mode signal in the presence of the external signal and the pulse signal supplied from the voltage detector 14. The mode signal is used to turn off the triac 9 and then to switch the relay 3 from the triac side to the inverter side as shown in the flow chart of FIG. 5. Then, an inverter signal 16 (FIG. 6) is applied to the power transistors 12a to 12d at a timing synchronous with the source voltage phase detected by the source voltage detector 14. As a result, the power transistors 12a to 12d are driven by the control section 11 so that an AC voltage of predetermined frequency is obtained as an inverter output. The motor 4 for driving the compressor is driven by the inverter output. The refrigerator thus enters into the rapid freeze mode with variable freezing capacity thereof.

Figure 4:
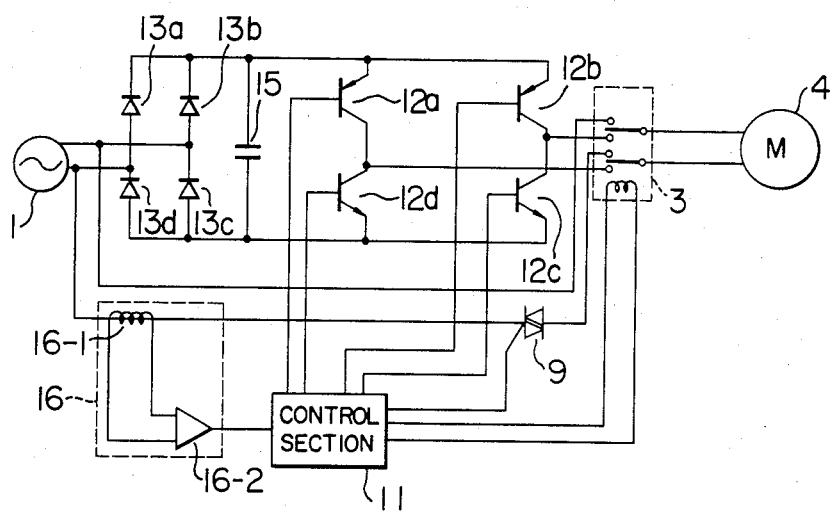

FIG. 4 shows a circuit in which a phase detector 16 for detecting the current phase (including a coil 16-1 and an amplifier 16-2) is inserted in place of the source voltage detector 14 in the circuit of FIG. 3.

In the circuits shown in FIGS. 3 and 4, the inverter is used for driving operation at a timing synchronous with the source voltage phase, and therefore the inverter is apparently driven with a small slip of the motor, thus reducing the current flowing in the power transistors. As consequence, no large current flows at the time of switching unlike in switching regardless of the source voltage phase, thus eliminating the shortcoming of damaging the inverter device such as a transistor.

The external signal used as a control signal in the above-mentioned embodiment may be replaced with equal effect by a signal from such means as a timer to operate the inverter after the lapse of a predetermined time. Further, any phase of power may be used with the present invention, although the above-mentioned embodiment concerns a single-phase power supply.

It will thus be understood from the foregoing description that according to the present invention, there is provided a control system which is capable of driving the compressor without any efficiency reduction under the normal operating mode and varying the capacity thereof by driving the inverter in rapid freeze mode.

We claim:

1. A control system for a refrigerator including a compressor for making up a freezing cycle and a motor driven by a commercial power supply for driving said compressor, said control system comprising an inverter circuit connected to said commercial power supply, a power switch connected to said commercial power supply, switching means connected to said motor and switchable between a first mode where said motor is connected to said commercial power supply through said inverter and a second mode where said motor is connected to commercial power supply through said power switch, and control means responsive to a predetermined external signal applied thereto for producing a control signal for turning off said power switch and then switching said switching means from said second mode to said first mode.

2. A control system according to claim 1, wherein said control means includes a phase detector for detecting a phase of voltage of said commercial power supply and means for producing said control signal upon detection of a predetermined condition of the voltage of said commercial power supply.

3. A control system according to claim 2, wherein said control means further comprises means for applying said control signal to said inverter thereby actuating said inverter after said switching means has been switched to said first mode.

4. A control system according to claim 1, wherein said control means includes a phase detector for detecting a phase of current supplied to said motor from said commercial power supply and means for producing said control signal upon detection of a predetermined condition of the phase of the current supplied to said motor.

5. A control system according to claim 4, wherein said control means further comprises means for applying said control signal to said inverter thereby actuating said inverter after said switching means has been switched to said first mode.

6. A control system according to claim 1, wherein the predetermined external signal is indicative of a rapid freeze cycle for the refrigerator.

* * * * *